(12) United States Patent
Hoareau et al.

(10) Patent No.: US 9,058,479 B2
(45) Date of Patent: Jun. 16, 2015

(54) PASS-PATTERN AUTHENTICATION FOR COMPUTER-BASED SECURITY

(75) Inventors: Guillaume Hoareau, Montpellier (FR); Althea Hookens, Melbourne (AU); John G. Musial, Newburgh, NY (US); Sandeep R. Patil, Pune (IN)

(73) Assignee: International Business Machines Corporation, Armonk, NY (US)

(*) Notice: Subject to any disclaimer, the term of this patent is extended or adjusted under 35 U.S.C. 154(b) by 199 days.

(21) Appl. No.: 13/448,814

(22) Filed: Apr. 17, 2012

(65) Prior Publication Data
US 2013/0276095 A1 Oct. 17, 2013

(51) Int. Cl.
*H04L 29/00* (2006.01)
*G06F 21/36* (2013.01)

(52) U.S. Cl.
CPC ..................................... *G06F 21/36* (2013.01)

(58) Field of Classification Search
USPC ............................... 382/117; 726/16; 713/189
See application file for complete search history.

(56) References Cited

U.S. PATENT DOCUMENTS

| | | | |
|---|---|---|---|
| 4,218,738 A | 8/1980 | Matyas et al. | |
| 6,151,593 A | 11/2000 | Cho et al. | |
| 7,962,757 B2* | 6/2011 | Jonas et al. | 713/189 |
| 7,992,005 B2 | 8/2011 | Torres et al. | |
| 8,170,295 B2* | 5/2012 | Fujii et al. | 382/117 |
| 2005/0160297 A1 | 7/2005 | Ogawa | |
| 2005/0246542 A1 | 11/2005 | Dana et al. | |
| 2007/0226784 A1 | 9/2007 | Ueda et al. | |
| 2009/0149156 A1* | 6/2009 | Yeo | 455/411 |
| 2010/0031200 A1 | 2/2010 | Chen | |
| 2010/0043063 A1 | 2/2010 | Ueda et al. | |
| 2011/0050394 A1 | 3/2011 | Zhang et al. | |
| 2013/0047236 A1* | 2/2013 | Singh | 726/7 |

OTHER PUBLICATIONS

Boiko, et al., "A Methodology for Testing IPSec-based Systems"; SoftCOM 2004 Proceedings; pp. 22-26; www.ist-world.org; (2004).
Fazel, et al.; "An Overview of Statistical Pattern Recognition Techniques for Speaker Verification", Circuits&Systems Magazine, IEEE, 2nd Qtr; vol. 11, Issue 2, pp. 62-81(2011).

(Continued)

*Primary Examiner* — Brandon Hoffman
*Assistant Examiner* — Michael D Anderson
(74) *Attorney, Agent, or Firm* — Cantor Colburn LLP

(57) ABSTRACT

Implementing security access includes mapping input elements of an input device to a coordinate system. Each of the input elements is assigned to a point on the coordinate system that is defined by respective coordinate values. The security access also includes receiving a number of inputs via corresponding input elements. An input element assigned to a first input of the number of inputs is denoted as a starting point for a sequence. Beginning with an input in the sequence that immediately follows the first input in the sequence, the security access further includes identifying a directional orientation of each of the input elements as compared to an input element immediately preceding the input element in the sequence, creating a directional pattern sequence from the directional orientation identified for each of the input elements, and providing access to an information source using the directional pattern sequence as an authentication mechanism.

16 Claims, 6 Drawing Sheets

(56) References Cited

OTHER PUBLICATIONS

Anonymous; "Method for storing hash values of parts of user's historical passwords on a given protected resource in a data store and an algorithm to check previously used passwords against a new password during password change operation to prevent the use of new passwords, which are similarly formulated"; http://priorartdatabase.com/IPCOM/000196275; IPCOM000196275D; pp. 1-3 (2010).
Non Final Office Action for U.S. Appl. No. 13/558,623, mailed Oct. 23, 2013, 16 pages.
U.S. Appl. No. 13/558,623; Final Office Action; Date Filed: Jul. 26, 2012; Date Mailed May 30, 2014; pg. 1-15.

* cited by examiner

PASS-PATTERN AUTHENTICATION FOR COMPUTER-BASED SECURITY

BACKGROUND

The present invention relates to computer-based security, and more specifically, to pass-pattern authentication for computer-based security.

The use of passwords as a means for authentication is a continued source of vulnerability. In order to enhance the likelihood of remembering a password, individuals tend to select common or familiar words, phrases, names, or dates that are relevant to the user. However, in doing so, it tends to make the password more vulnerable to compromise. A recent study indicates that a few of the most common passwords are "12345," "password," and "qwerty." These passwords may be easily uncovered by one who is able to apply a common password cracking tool to ascertain user passwords and gain access to user accounts. Further, these passwords are also subject to detection by others via direct observation (e.g., viewed by another at the time a user enters the password at an ATM).

In some cases, techniques have been instituted to combat the use of common terms as passwords, such as extending the minimum length of the password, requiring the use of alphanumeric values in the password, and requiring a combination of upper and lower case letters, to name a few. However, as more restrictions are placed on the creation of a password, the greater the tendency that a user will have difficulty remembering it. If the password is too difficult to remember, a user may be tempted to write it down and keep it with him/her or near the device used to authenticate, which greatly increases the vulnerability factor and may even defeat the purpose of having a password.

SUMMARY

According to another embodiment of the present invention, a system for implementing security access is provided. The system includes a computer processor and a security application executable by the computer processor. The security application implements a method. The method includes mapping input elements of an input device to a two-dimensional coordinate system. Each of the input elements is assigned to a point on the coordinate system that is defined by respective coordinate values. The method also includes receiving a plurality of inputs via corresponding input elements. An input element assigned to a first input of the plurality of inputs is denoted as a starting point for an input sequence. Beginning with an input in the input sequence that immediately follows the first input in the input sequence, the method further includes identifying via corresponding coordinate values a directional orientation of each of the input elements corresponding to the plurality of inputs as compared to an input element immediately preceding the input element in the input sequence, creating a directional pattern sequence from the directional orientation identified for each of the input elements in the input sequence, and providing access to an information source using the directional pattern sequence as an authentication mechanism.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

According to an exemplary embodiment, pass-pattern authentication for computer-based security access (also referred to herein as "security access") processes is provided. The security access processes provide a secure authentication technique using unique directional pattern sequences of inputs that are selected by, or assigned to, users. A directional pattern sequence contains a series of direction instructions that are followed based on a starting location on an input device and are entirely independent of the underlying assigned input device characters (i.e., authentication is not reliant upon or limited to any certain character letter, symbol or numeric values on an input device, such as a key board, key pad, touch screen, etc.). Authentication of the user is based solely on the directional pattern sequence entered by the user that begins at a random starting point on the input device.

The starting point on an interface of the input device that captures the directional pattern sequence may be either randomly assigned and indicated by the system implementing the security access or it may be randomly selected independently by the user. Since the directional pattern sequence is not associated to any particular character, letter, symbol or numeric value (i.e., the key values on a keyboard or touch points on a touch screen), the user need not associate it with any word, phrase or name that would be important to him/her. In addition, the keys/points used to enter the directional pattern sequence need not be contiguous, as long as the directional pattern is followed (i.e., it is the relative orientation (e.g., up, down, left right) of each key/point from a previous key/point that is compared in the sequence). Thus, authentication for a single individual may be accomplished using entirely different keys/points on the same interface each time the user authenticates. These and other features of the security access processes will now be described.

Figure 1:
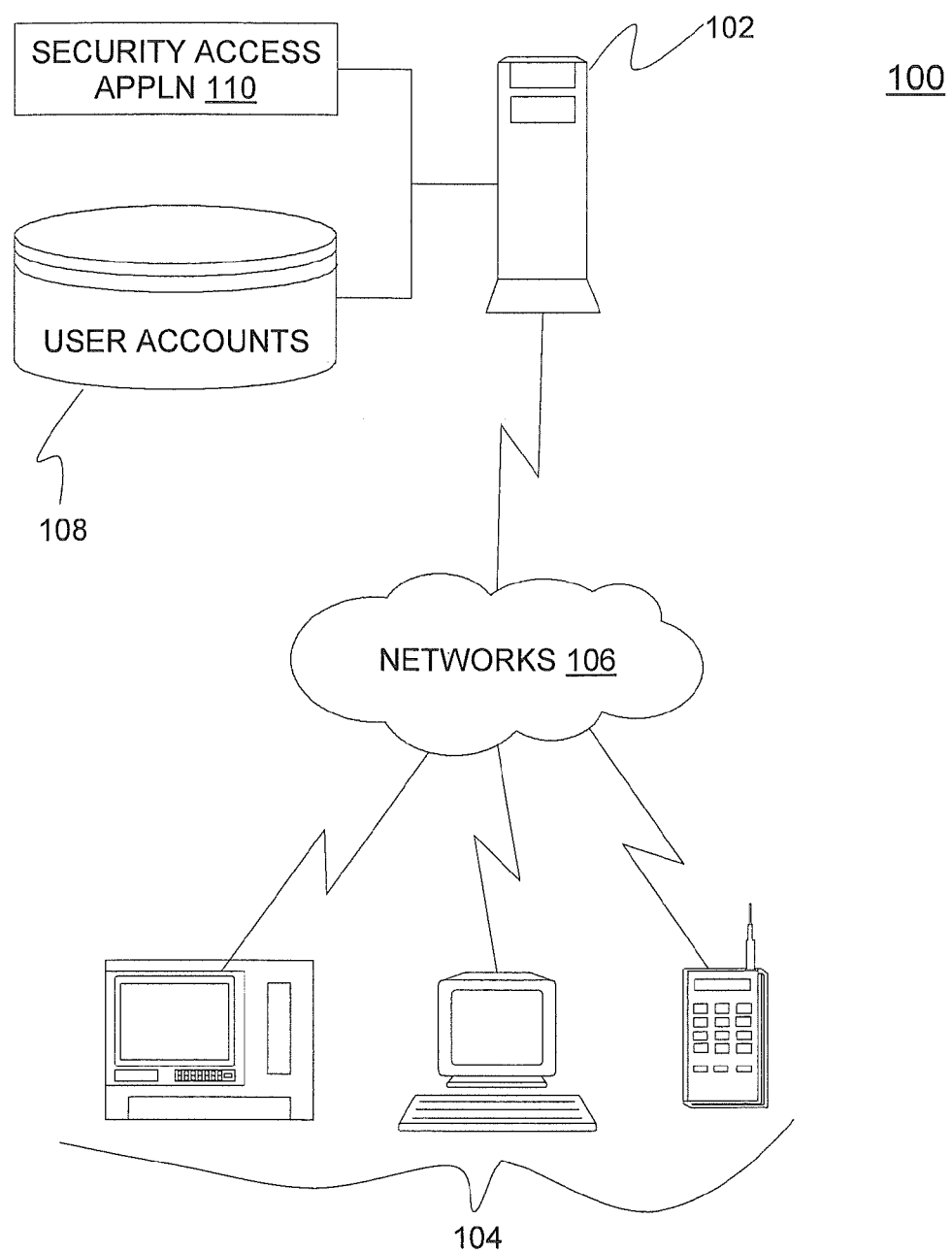
FIG. 1 depicts a block diagram of a system upon which security access may be implemented according to an embodiment of the present invention.
Figure 2:
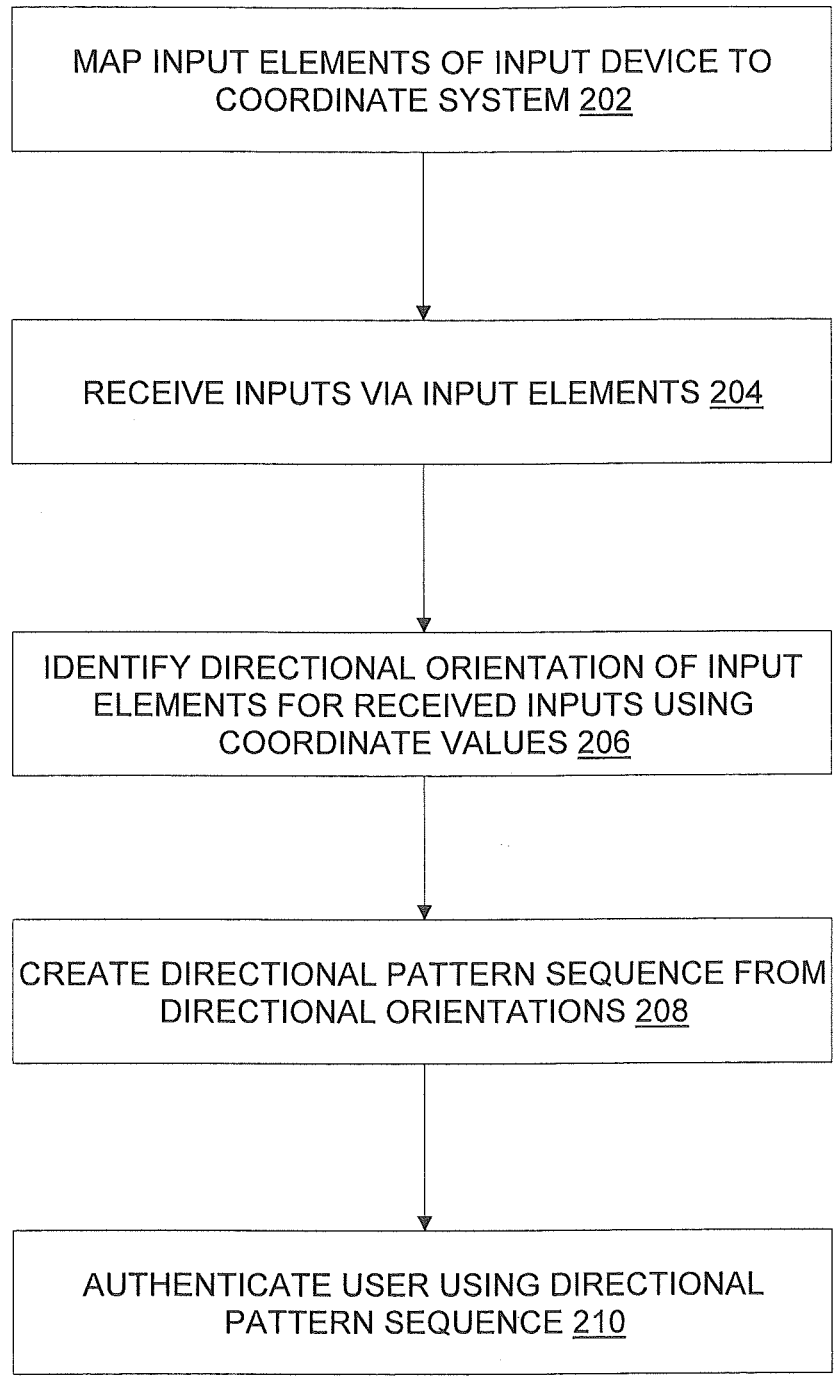
FIG. 2 depicts a flow diagram describing a process for implementing security access according to an embodiment of the present invention.
Figure 3:
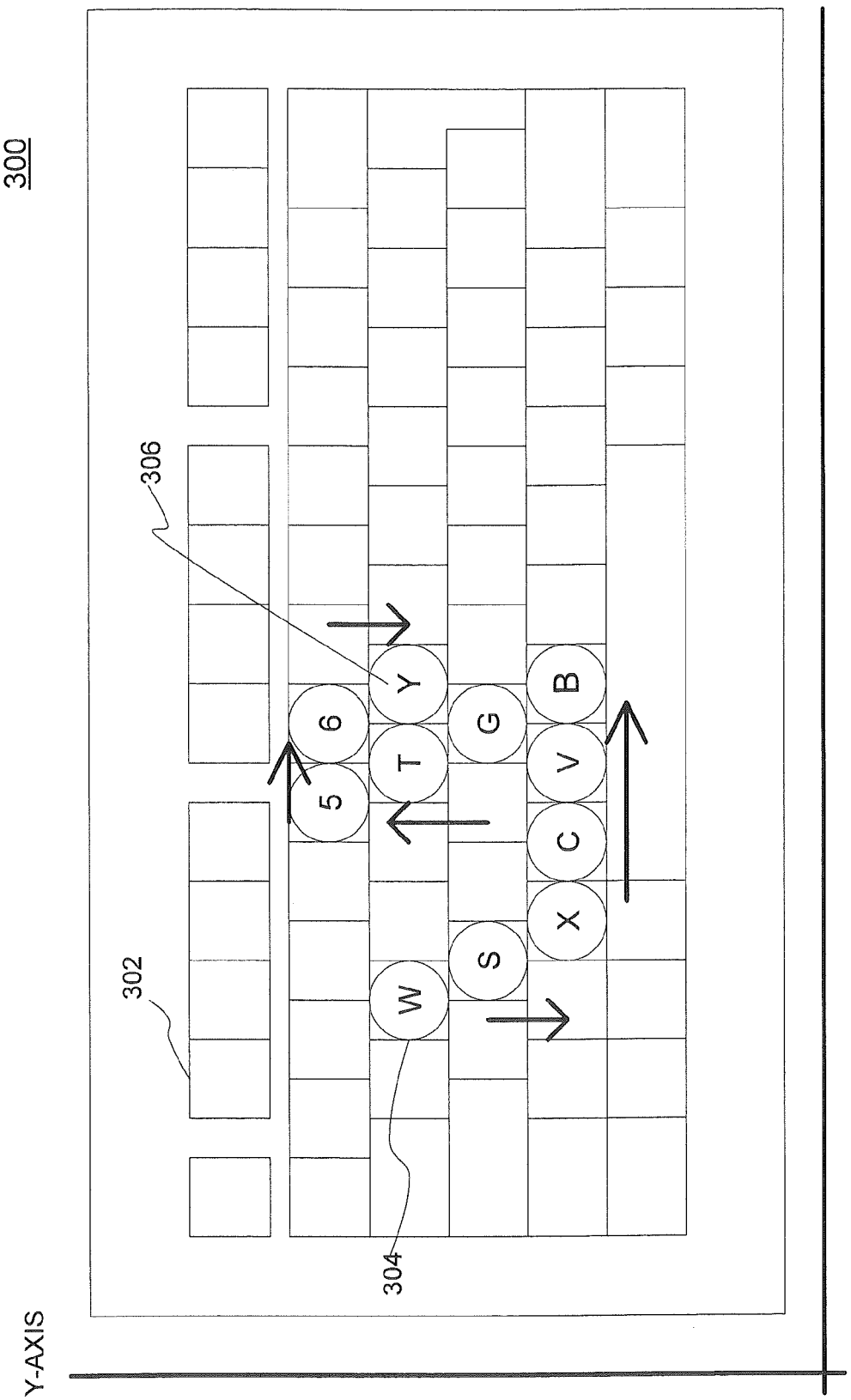
FIG. 3 depicts a diagram of an interface used in implementing security access according to an embodiment of the present invention.

Turning now to FIG. 1, a system 100 upon which the security access processes may be implemented will now be described in an exemplary embodiment. The system 100 of FIG. 1 includes a host system 102, user systems 104, and one or more networks 106. In one embodiment, the host system 102 executes computer instructions for implementing the exemplary security access processes described herein. The host system 102 may represent a network server that performs transactions on behalf of users upon successful authentication to the network server. The transactions may include providing information, goods, and/or services to users.

In an alternative embodiment, the user systems 104 may execute computer instructions for implementing the exemplary security access processes described herein. The user systems 104 may represent one or more of a kiosk (e.g., an ATM), a personal device owned or operated by one or more users, and a mobile computing device (e.g., a smart phone or personal digital assistant), to name a few. The user system 104 may be configured to authenticate the user before providing access to the applications and data stored on the user systems 104. In one embodiment, the user system 104 is a personal computer or laptop. In another embodiment, the user system 104 is a server-attached terminal. If the user system 104 is a server-attached terminal, the user system 104 and/or the server-attached terminal may be configured to authenticate the user before providing access to applications and data stored on either the user system 104 or on a network managed by the server. Alternatively, as indicated above, the user system 104 may be a mobile computing device such as a smart phone or personal digital assistant.

The networks 106 may include any type of known networks including, but not limited to, a wide area network (WAN), a local area network (LAN), a global network (e.g. Internet), a virtual private network (VPN), and an intranet. The networks 106 may be implemented using a wireless network or any kind of physical network implementation known in the art. A user system 104 may be coupled to the host system through multiple networks (e.g., intranet and Internet) so that not all user systems 104 are coupled to the host system 102 through the same network. One or more user systems 104 and the host system 102 may be connected to the networks 106 in a wireless fashion.

The host system 102 is communicatively coupled to a storage device 108. The storage device 108 stores data relating to the security access processes and may be implemented using a variety of devices for storing electronic information. In an exemplary embodiment, the storage device 108 stores instructions used in providing the security access processes as will be described herein. The storage device 108 may also store directional pattern sequences in user accounts, which sequences are used in authenticating users before allowing access to resources managed by or on behalf of the host system. It is understood that the storage device 108 may be implemented using memory contained in the host system 102 or it may be a separate physical device. The storage device 108 may be logically addressable as a consolidated data source across a distributed environment that includes networks 106. Information stored in the storage device 108 may be retrieved and manipulated via the host system 102.

In an embodiment, the host system 102 operates as a database server and coordinates access to application data including data stored on the storage device 108.

The host system 102 depicted in FIG. 1 may be implemented using one or more servers operating in response to a computer program stored in a storage medium accessible by the server. The host system 102 may operate as a network server (e.g., a web server) to communicate with the user system 104. The host system 102 handles sending and receiving information to and from the user system 104 and can perform associated tasks.

The host system 102 may also operate as an application server. The host system 102 executes one or more computer programs to implement the security access processes. As shown in FIG. 1, the host system 102 these computer program (s) are implemented by a security access application 110.

As indicated above, in an alternative embodiment, the security access application 110 may be stored and executed on the user system 104 (not shown), e.g., for use in authenticating a user of the user system 104 before providing access to data and applications stored on the user system 104.

The security access processes provide a means to authenticate a user using a directional pattern sequence associated with a user before providing the user with access to a system's resources. The directional pattern sequence may be assigned by a system provider (e.g., the host system 102) or may be user-generated (e.g., by a user of the user system 104). Turning now to FIGS. 2-6, a process and sample interfaces of input devices used in creating a directional pattern sequence via the security access system will now be described in an exemplary embodiment.

The process begins at step 202 whereby input elements of an input device are mapped to a coordinate system (the coordinate system shown generally in interfaces 300, 400, 500, and 600 of FIGS. 3-6). In one embodiment, the coordinate system is two-dimensional having an x-axis and a y-axis, and sample corresponding coordinate values may be x1y1, x2y1, x3y1, etc., where each coordinate value represents a key or point on the input device. Once the mapping has been completed, the input may be used to create new directional pattern sequences and authenticate users having existing directional pattern sequences. The processes described in FIG. 2 assume a user-generated directional pattern sequence.

At step 204, the security access application 110 receives inputs via input elements on the input devices. As shown in FIGS. 3-6, the input elements may be keys 302 and 402 of FIGS. 3 and 4 or may be touch points 502 and 602 of FIGS. 5 and 6. These inputs are selections of the input elements 302, 402, 502, and 602 by the user that form an ordered input sequence, which is then processed by the security access application 110 as described herein. The input elements may be keys when the input device is a key board or key pad, or the input elements may be touch points when the input device is a touch screen. The input device may be part of one or more of the user systems 104 of FIG. 1. In an exemplary embodiment, the security access application 110 notes the coordinates of the initial input by the user and designates this initial input as the starting point for use in ascertaining directional orientations of the input sequence. As shown in FIGS. 3-6, the initial inputs are denoted as 304, 404, 504, and 604, respectively. The initial input of the input sequence may be randomly selected by the user or may be determined and prompted by the system (e.g., displayed on the interface by the host system 102 and/or user systems 104). As shown in FIGS. 3-6 the last input of the input sequence is denoted as 306, 406, 506, and 606 in the Figures.

At step 206, the security access application 110 identifies directional orientation of input elements for the input sequence using coordinate values of the respective input elements. The directional orientation of each input element or point is determined based upon the current point's relative position as compared to the previous point's relative position. For example, using the sample coordinate values above, a first selected input element represents x1y1 and a second selected input element represents x1y3. The directional orientation may be specified as 'up' since the second selected input element has a y coordinate that is greater than the y coordinate of the first input element. The directional orientations are reflected by arrows, as shown in FIGS. 3-6.

At step 208, the security access application 110 creates a directional pattern sequence from the directional orientations identified in step 206. The directional pattern sequence reflects a series of directional instructions (e.g., up, down, left and right) that is to be followed by the user based on an initial starting point (i.e., first input in the input sequence). This directional pattern sequence may be stored, e.g., in the storage device 108 in a user account or in memory of the user's personal computer.

At step 210, the security access application 110 uses the directional pattern sequence to authenticate the user. As indicated above, the user selects any of the input elements on the input device as the first input, followed by the directional instructions forming the directional pattern sequence. By way of example, suppose the user is accessing a personal computer in which an existing directional pattern sequence is stored for the user. The existing directional pattern sequence is: down, down, right, right, right, up, up, up, right, down. The authentication begins when the user randomly selects the first input element (e.g., 304), or is prompted by the security access application 110 to select an input element as the first input. Suppose the user selects the input key labeled 'w' as the first input. Using the directional instructions of the user's directional pattern sequence, the user would enter keys labeled s-x-c-v-b-g-t-5-6-y following the pattern 'down, down, right, right, right, up, up, up, right, down' above. Since the directional pattern sequence is completely unrelated to the underlying character values of the keys on the input device, the user authentication can be realized even when the user selects completely different input elements. For example, the next time the user initiates authentication, the user may select 'y' as the first input and, using the directional pattern sequence, the user enters keys labeled h n m , . l o 9 0 p.

Figure 4:
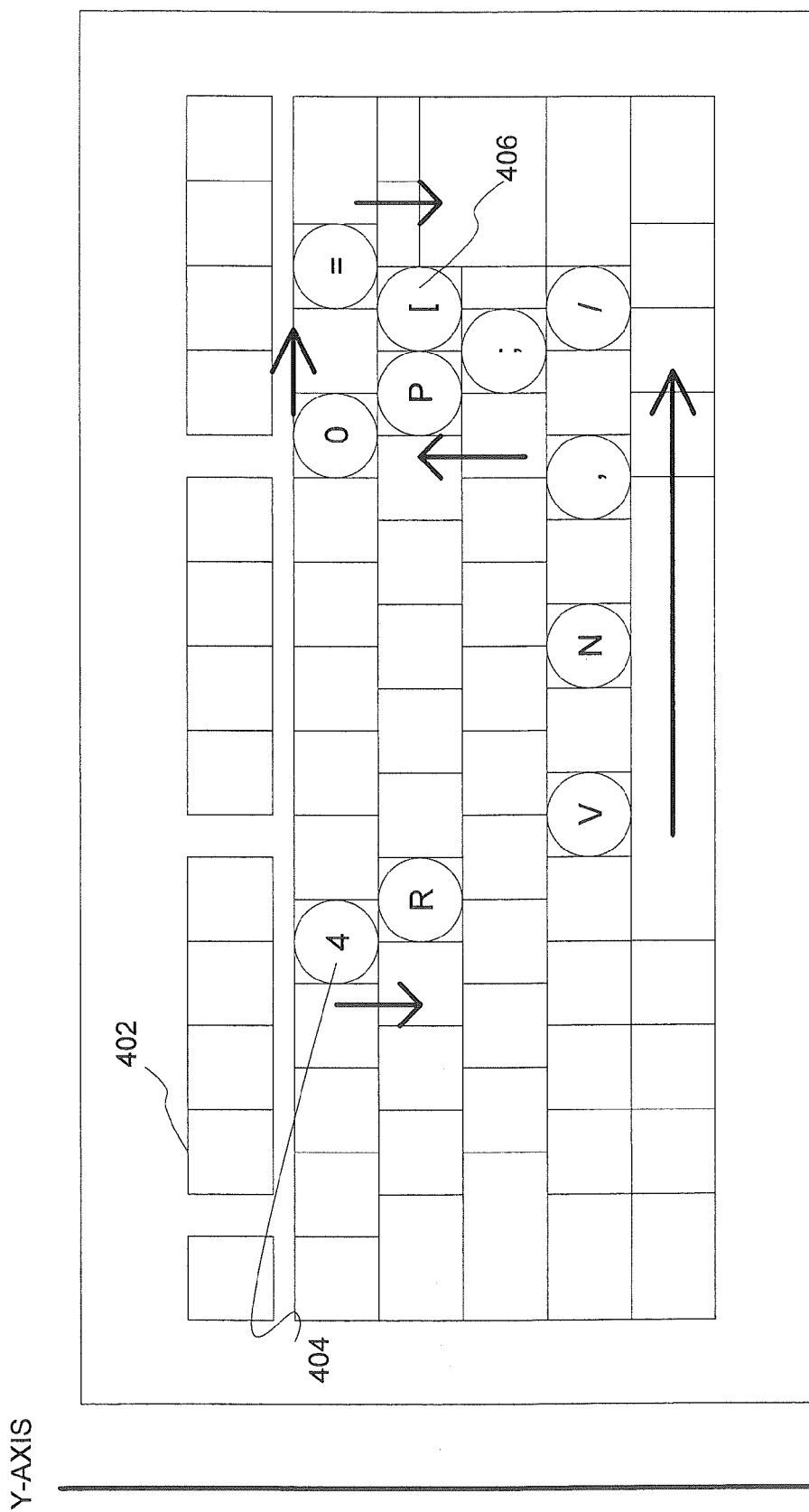
FIG. 4 depicts a diagram of an interface used in implementing security access according to another embodiment of the present invention.
Figure 5:
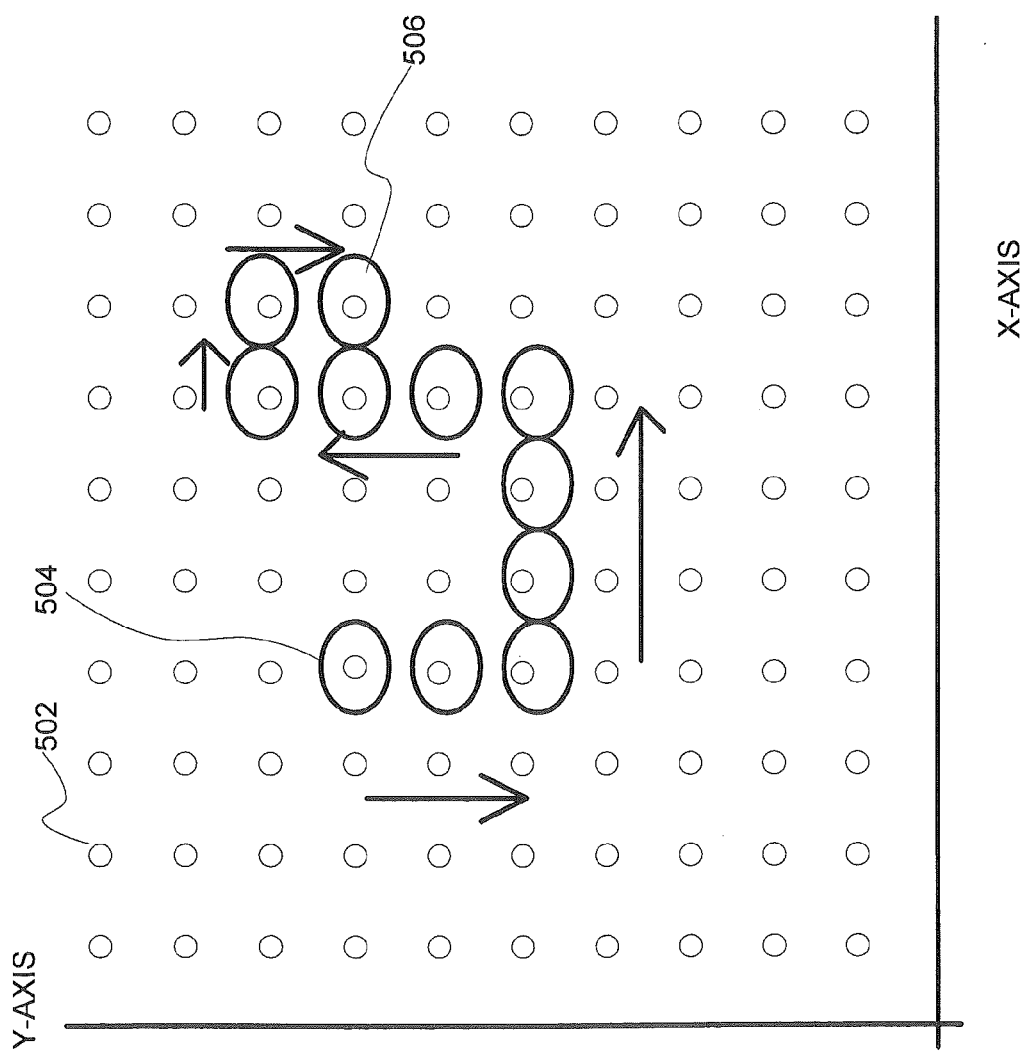
FIG. 5 depicts a diagram of an interface used in implementing security access according to a further embodiment of the present invention.
Figure 6:
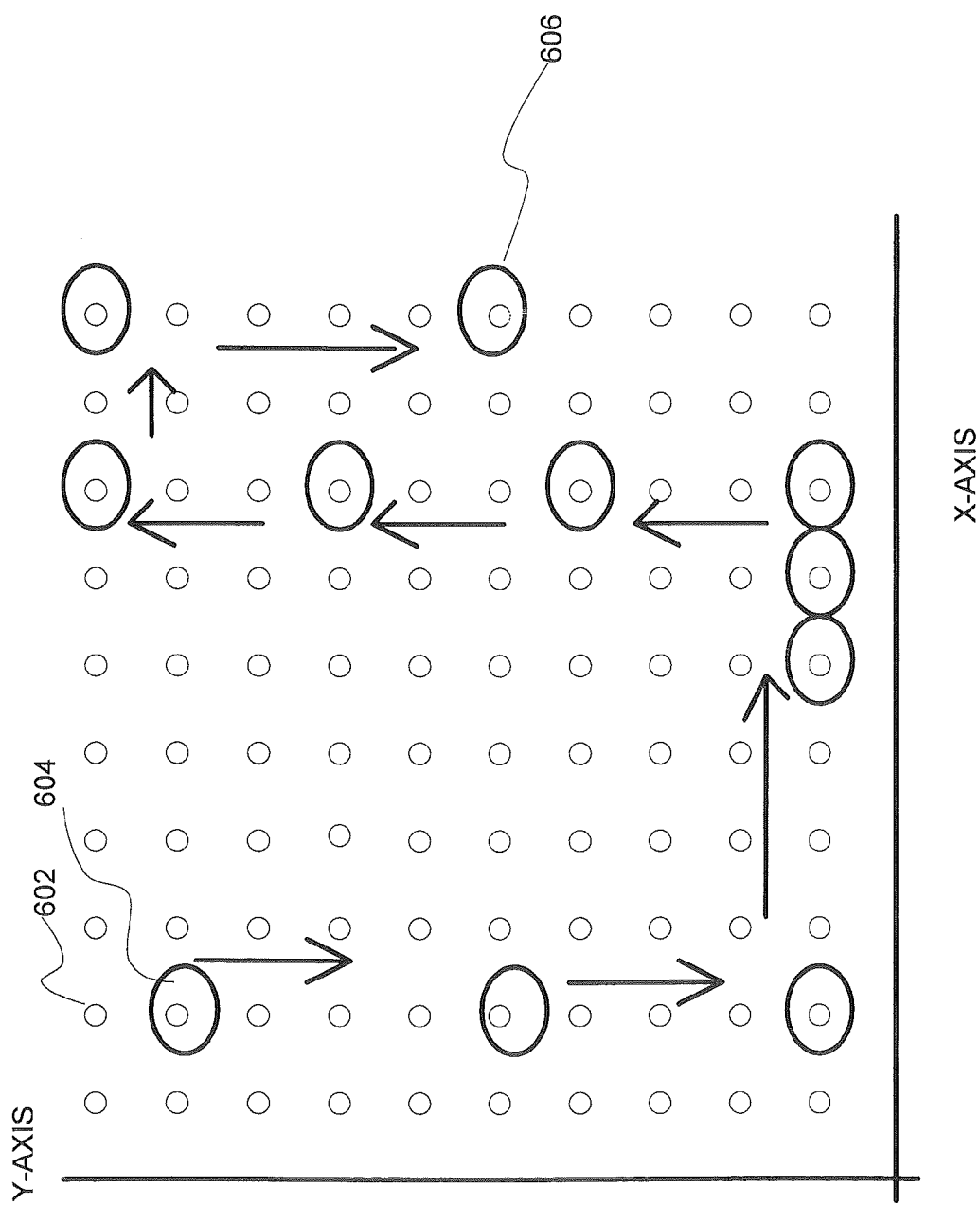
FIG. 6 depicts a diagram of an interface used in implementing security access according to yet a further embodiment of the present invention.

Additionally, the directional pattern sequence may be followed by selecting non-contiguous input elements, a sample of which is shown in FIGS. 4 and 6. For example, using the above directional pattern sequence, the user may again start the authentication by selecting the input element '4,' denoted as 404 in FIG. 4. The user then enters keys labeled r v n , / ; p 0= [." So long as the directional orientation of the directional pattern sequence is followed, the authentication will accept the inputs as conforming to the directional pattern sequence.

The security access application 110 may be configured to implement various restrictions on the user's selection of a directional pattern sequence. For example, the security access application 110 may be configured to require that the user select a minimum number of inputs or points for the sequence. Alternatively, or in addition thereto, the security access application 110 may require the user select a minimum number of directional changes within the sequence. The extent of the restrictions may be a function of the importance of the underlying data or systems protected. For example, a bank may require more strict sequences (e.g., a minimum of four inputs and a minimum of two direction changes, such as up, up, right, down). However, a directional pattern sequence to a high security area of an airport may require a minimum of ten input elements and four direction changes.

If the first input is system generated, then based on the unique characteristics of a person's particular pattern, the user may also request (one or more times) that the system provide an alternate random starting point on the input device that would better accommodate the unique directional characteristics of their particular pattern (e.g., where the inputs of the directional pattern would move off an edge of the input device).

Technical effects of the invention include security access processes that provide pass-pattern authentication for computer-based security access. The security access processes provide a secure authentication technique using unique direction pattern sequences of key inputs that are selected by, or assigned to, users. The directional pattern sequence contains a series of direction instructions that are followed based on a starting location on the key pad and are entirely independent of the underlying assigned key pad characters (i.e., authentication is not reliant upon or limited to any certain character letter, symbol or numeric values on the keyboard or input device). Authentication of the user is solely based on the directional pattern sequence entered by the user that begins at a random staring point on the key pad, touch screen, or other input device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:
1. A system, comprising:
a computer processor; and
a security access application executable by the computer processor, the security access application configured to implement a method, the method comprising:
mapping keys of a physical keyboard to a two-dimensional coordinate system, each of the keys assigned to a point on the coordinate system that is defined by respective coordinate values;
receiving a plurality of inputs via corresponding keys, wherein a key assigned to a first input of the plurality of inputs is denoted as a starting point for an input sequence;
beginning with an input in the input sequence that immediately follows the first input in the input sequence, identifying via corresponding coordinate values a directional orientation of each of the keys corresponding to the plurality of inputs as compared to a key immediately preceding the key in the input sequence;
creating a directional pattern sequence from the directional orientation identified for each of the keys in the input sequence, the directional pattern sequence having no association with key values of the keys, and the directional pattern sequence remaining fixed through each authentication, and any of the keys is selectable as a starting point for the directional pattern sequence at each instance of authentication; and providing access to an information source using the directional pattern sequence as an authentication mechanism.

2. The system of claim 1, wherein the directional orientation is any one of up, down, left and right, and the first input represents a randomly determined and selected key, and the stored directional pattern sequence contains directional instructions indicative of the directional orientation, the directional instructions based from the randomly determined and selected key;

wherein the first input is randomly determined by the user at each instance of authentication.

3. The system of claim 1, wherein the authentication mechanism is implemented by comparing the directional pattern sequence with a stored directional pattern sequence assigned to a user, and access to the information source is provided only when the directional pattern sequence matches the stored directional pattern sequence.

4. The system of claim 1, wherein the method further comprises:

defining requirements for creating the directional pattern sequence including specifying at least one of a minimum number of keys and a minimum number of direction changes contained in the directional pattern sequence.

5. The system of claim 1, wherein the directional pattern sequence is created using non-contiguously disposed keys.

6. The system of claim 1, wherein the keys are physically resident on the keyboard.

7. A method, comprising:

mapping, via a processor, keys of a physical keyboard to a two-dimensional coordinate system, each of the keys assigned to a point on the coordinate system that is defined by respective coordinate values;

receiving, from the keyboard, a plurality of inputs via corresponding keys, wherein a key assigned to a first input of the plurality of inputs is denoted as a starting point for an input sequence;

beginning with an input in the input sequence that immediately follows the first input in the input sequence, identifying via corresponding coordinate values a directional orientation of each of the keys corresponding to the plurality of inputs as compared to a key immediately preceding the key in the input sequence;

creating a directional pattern sequence from the directional orientation identified for each of the keys in the input sequence, the directional pattern sequence having no association with key values of the keys, and the directional pattern sequence remaining fixed through each authentication, and any of the keys is selectable as a starting point for the directional pattern sequence at each instance of authentication; and providing access to an information source using the directional pattern sequence as an authentication mechanism.

8. The method of claim 7, wherein the directional orientation is any one of up, down, left and right, and the first input represents a randomly selected key, and the stored directional pattern sequence contains directional instructions indicative of the directional orientation, the directional instructions based from the randomly determined and selected key;

wherein the first input is randomly determined by the user at each instance of authentication.

9. The method of claim 7, wherein the authentication mechanism is implemented by comparing the directional pattern sequence with a stored directional pattern sequence assigned to a user, and access to the information source is provided only when the directional pattern sequence matches the stored directional pattern sequence.

10. The method of claim 7, further comprising:

defining requirements for creating the directional pattern sequence including specifying at least one of a minimum number of keys and a minimum number of direction changes contained in the directional pattern sequence.

11. The method of claim 7, wherein the directional pattern sequence is created using non-contiguously disposed keys.

12. A computer program product comprising a computer-readable storage medium embodied with instructions, which when executed by a computer cause the computer to implement a method, the method comprising:

mapping keys of a physical keyboard to a two-dimensional coordinate system, each of the keys assigned to a point on the coordinate system that is defined by respective coordinate values;

receiving a plurality of inputs via corresponding keys, wherein a key assigned to a first input of the plurality of inputs is denoted as a starting point for an input sequence;

beginning with an input in the input sequence that immediately follows the first input in the input sequence, identifying via corresponding coordinate values a directional orientation of each of the keys corresponding to the plurality of inputs as compared to a key immediately preceding the key in the input sequence;

creating a directional pattern sequence from the directional orientation identified for each of the keys in the input sequence, the directional pattern sequence having no association with key values of the keys, and the directional pattern sequence remaining fixed through each authentication, and any of the keys is selectable as a starting point for the directional pattern sequence at each instance of authentication; and providing access to an information source using the directional pattern sequence as an authentication mechanism.

13. The computer program product of claim 12, wherein the directional orientation is any one of up, down, left and right, and the first input represents a randomly determined and selected key, and the stored directional pattern sequence contains directional instructions indicative of the directional orientation, the directional instructions based from the randomly determined and selected key;

wherein the first input is randomly determined by the user at each instance of authentication.

14. The computer program product of claim 12, wherein the authentication mechanism is implemented by comparing the directional pattern sequence with a stored directional pattern sequence assigned to a user, and access to the information source is provided only when the directional pattern sequence matches the stored directional pattern sequence.

15. The computer program product of claim 12, wherein the method further comprises:

defining requirements for creating the directional pattern sequence including specifying at least one of a minimum number of keys and a minimum number of direction changes contained in the directional pattern sequence.

16. The computer program product of claim 12, wherein the directional pattern sequence is created using non-contiguously disposed input elements.

* * * * *